(12) United States Patent
Kiyomoto et al.

(10) Patent No.: US 7,978,851 B2
(45) Date of Patent: Jul. 12, 2011

(54) KEYSTREAM ENCRYPTION DEVICE, METHOD, AND PROGRAM

(75) Inventors: Shinsaku Kiyomoto, Fujimino (JP); Toshiaki Tanaka, Fujimino (JP)

(73) Assignee: KDDI Corporation, Tokyo (JP)

( * ) Notice: Subject to any disclaimer, the term of this patent is extended or adjusted under 35 U.S.C. 154(b) by 1025 days.

(21) Appl. No.: 11/880,260

(22) Filed: Jul. 20, 2007

(65) Prior Publication Data

US 2007/0263861 A1   Nov. 15, 2007

Related U.S. Application Data

(63) Continuation-in-part of application No. PCT/JP2005/021302, filed on Nov. 18, 2005.

(30) Foreign Application Priority Data

Mar. 23, 2005 (JP) ................................ 2005-083681

(51) Int. Cl.
   *H04L 9/26* (2006.01)
(52) U.S. Cl. .......................................... 380/46; 380/42
(58) Field of Classification Search .................... 380/42, 380/44–47
   See application file for complete search history.

(56) References Cited

U.S. PATENT DOCUMENTS

| | | | |
|---|---|---|---|
| 6,560,338 | B1 | 5/2003 | Rose et al. |
| 2003/0152221 | A1 * | 8/2003 | Cheng et al. ............... 380/46 |
| 2003/0194087 | A1 * | 10/2003 | Jansen et al. ............... 380/265 |
| 2005/0244000 | A1 * | 11/2005 | Coleman ................. 380/44 |

FOREIGN PATENT DOCUMENTS

| | | |
|---|---|---|
| JP | 3-251890 | 11/1991 |
| JP | 2002-536912 | 10/2002 |

OTHER PUBLICATIONS

IEICE Technical Report, ISEC2004-41-66, ISSN 0913-5685, vol. 104, No. 200 (Jul. 21, 2004), http://www.ieice.org/.
Shinsaku Kiyomoto, Evaluation of Guess-and-Determine Attacks on Clock Controlled Stream Ciphers, IPSJ SIG Technical Reports, Information Processing Society of Japan, Jul. 21, 2004, vol. 2004, No. 75 with an English Abstract thereof.
Office Action (Notice of Allowance) issued in Japanese Patent Application No. 2007-509142 on Apr. 25, 2011 with an English translation thereof.

* cited by examiner

*Primary Examiner* — Minh Dinh
*Assistant Examiner* — Venkat Perungavoor
(74) *Attorney, Agent, or Firm* — Edwards Angell Palmer & Dodge LLP; David G. Conlin; David A. Tucker

(57) ABSTRACT

A stream encryption device generates a first pseudo random number sequence from key information, generates a second pseudo random number sequence according to clock control performed according to the first pseudo random number sequence, and subjects it to a nonlinear function calculation, thereby generating a key stream. The stream encryption device performs XOR operation with a plain text so as to create an encrypted text. The stream encryption device performs an encryption process in units of words by using a clock controller. It includes: a first pseudo random number generation means to generate a first pseudo random number sequence from key information; a second pseudo random number generation means to generate a second pseudo random number sequence based on clock control performed according to the first pseudo random number sequence; and, a keystream generation means to generate a keystream by applying a nonlinear function calculation to the second pseudo random number sequence.

13 Claims, 12 Drawing Sheets

FIG. 7A  INPUT  | 1 | 2 | 3 | 4 | 5 | 6 | 7 | 8 | 9 |

FIG. 7B  PLANE CONVERSION

| 1 | 2 | 3 |
| 4 | 5 | 6 |
| 7 | 8 | 9 |

FIG. 7C  HORIZONTAL SHIFT

| 1 | 2 | 3 |
| 6 | 4 | 5 |
| 8 | 9 | 7 |

FIG. 7D  VERTICAL SHIFT

| 1 | 4 | 7 |
| 6 | 9 | 3 |
| 8 | 2 | 5 |

FIG. 7E  OUTPUT  | 1 | 4 | 7 | 6 | 9 | 3 | 2 | 8 | 5 |

KEYSTREAM ENCRYPTION DEVICE, METHOD, AND PROGRAM

CROSS-REFERENCE TO RELATED APPLICATIONS

The present application is a continuation-in-part patent application of co-pending International Patent Application No. PCT/JP2005/021302 filed on Nov. 18, 2005 that claims priority from Japanese Patent Application No. 2005-083681 filed on Mar. 23, 2005, entitled keystream encryption device, method and program by Shinsaku KIYOMOTO and Toshiaki TANAKA, and the contents of which are hereby incorporated herein by reference.

BACKGROUND OF THE INVENTION

1. Field of the Invention

The present invention relates to a stream encryption device, method and program which realize an encryption process in words unit by using a clock controller.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, various kinds of services utilizing computers have been provided. In many such services, ciphers are used to realize securing of communication. The most common encryption method is a common key cryptosystem in which one key performs encryption and decryption. This common key cryptosystem is roughly classified into two methods, namely a block encryption method and a stream encryption method. The former method is the method used most commonly. The latter method is superior in processing speed than the former method, thereby attracting attention.

An example of a method and a device for generating the above-described stream cipher is disclosed in the following patent document.

Patent Document 1: Published Japanese Translation No. 2002-536912 of the PCT International Publication.

In a stream encryption method, an encryption process is performed in units of bits, wherein clock control is used as one of the most common components. However, in a stream encryption method, an encryption process is performed in units of words, wherein a keystream of word length×N (N denotes number of clocks) is canceled by the clock control, thereby impairing the efficiency of the encryption and decryption considerably. Therefore, the clock control is not used.

Moreover, since the stream encryption methods do not have an independent key schedule algorithm, the security problem has been pointed out such that leakage of an internal state thereof can cause partial leakage of a secret key. Further, there has been a difficulty in establishing countermeasures regarding recovery when deviation in the synchronization occurs between sender and receiver (encryption/decryption).

In view of the above, it will be apparent to those skilled in the art from this disclosure that there exists a need for an improved apparatus and/or method. This invention addresses this need in the art as well as other needs, which will become apparent to those skilled in the art from this disclosure. The present invention has been achieved on the basis of the above circumstances.

SUMMARY OF THE INVENTION

It is an object of the present invention to provide a keystream encryption device, method, and program which realize efficient processing while improving security and securing randomness and periodicity when encryption is carried out in units of words.

It is also an object of the present invention to provide a keystream encryption device which attempts self-synchronization by using encrypted data, so that automatic recovery is possible at the receiver side even if deviation in the synchronization occurs between the sender and the receiver sides, and to provide a method and a program for realizing such keystream encryption.

In order to solve the above-described problems, the present invention is a stream encryption device which performs an encryption process in units of words by using a clock controller, and includes: a first pseudo random number generator that generates a first pseudo random number sequence from key information; a second pseudo random number generator that generates a second pseudo random number sequence based on clock control performed according to the first pseudo random number sequence; a keystream generator that generates a keystream by applying a nonlinear function calculation to the second pseudo random number sequence; and an encrypter that generates an encrypted text by performing exclusive OR (XOR) operation over the generated keystream and plain text.

In the present invention, at least one of the first and second pseudo random number generator may include a linear feedback shift register.

Moreover, in the present invention, the second pseudo random number generator uses root $\alpha$ of a polynomial which defines a finite field of degree 2, which is used to generate the second pseudo random number, and in a bit shift operation of feedback polynomial or characteristic polynomial in the linear feedback shift register composing the second pseudo random number generator, $\alpha^n$ is multiplied to perform clock control, where N represents word length and n represents the decided number of clocks.

Further, in the present invention, the first pseudo random number generator generates the first random number by applying a one-way function to the key information.

Furthermore, in the present invention, the keystream generator receives the second pseudo random number sequence as an input, applies thereto a nonlinear function calculation to generate a pre-keystream, performs XOR operation over the pre-keystream and the first or second pseudo random number sequence, and performs a linear mixing process on the result thereof to create a keystream.

The encryption device according to the present invention includes an internal memory which is updated according to data resulting from arithmetic addition or XOR operation performed over the keystream and the first or second pseudo random number sequence, and which provides the data, as an input data together with the second pseudo random number, to the pre-keystream generator.

The present invention provides a stream encryption device for performing an encryption process in units of words by using a clock controller. The stream encryption device may include a first pseudo random number generator that generates a first pseudo random number sequence from key information; a second pseudo random number generator that generates a second pseudo random number sequence based on clock control performed in accordance with the first pseudo random number sequence; a pre-keystream generator that apply first and second nonlinear function calculations to the second pseudo random number sequence to generate first and second pre-keystreams, respectively; a first logic gate that receives the first pre-keystream from the pre-keystream generator, the first logic gate receiving the first pseudo random number sequence from the first pseudo random number generator, the first logic gate performing exclusive OR operation over the first pre-keystream and the first pseudo random number sequence, thereby generating a keystream; an encrypter that performs exclusive OR operation over the keystream and a plain text, thereby generating an encrypted text; and an internal memory that receives the second pre-keystream from the pre-keystream generator, the internal memory updating the contents with the second pre-keystream so that the updated contents are fed back to the pre-keystream generator.

Further, the present invention is a stream encryption device, which performs an encryption process in units of words by using a clock controller, and includes: a first pseudo random number generator that generates a first pseudo random number sequence according to an internal state of the stream encryption; a second pseudo random number generator that generates a second pseudo random number sequence based on clock control performed according to the first pseudo random number sequence; a keystream generator that generates a keystream by applying a nonlinear function calculation to the second pseudo random number sequence; an encrypter that generates an encrypted text by performing XOR operation over the generated keystream and plain text; and an internal state setting unit which, after decrypting the encrypted text, to which identification information for self-synchronization is attached at predetermined intervals, by referring to the identification information, sets the encrypted text as an initial value, and then sets internal states of the first pseudo random number generator and the second pseudo random number generator according to the initial value and the key information.

Also, the present invention is a stream encryption method for performing an encryption process in units of words by using a clock controller, may include: a first step for generating a first pseudo random number sequence from key information; a second step for generating a second pseudo random number sequence based on clock control performed according to the first pseudo random number sequence; a third step for generating a keystream by receiving the second pseudo random number sequence as an input and by applying thereto a nonlinear function calculation; and a fourth step for generating an encrypted text by performing XOR operation over the generated keystream and plain text.

Moreover, in the present invention, the third step may include: a sub-step for generating a pre-keystream by applying a nonlinear function calculation to the second pseudo random number sequence; and a sub-step for generating a keystream by first performing XOR operation over the pre-keystream and the first or second pseudo random number sequence, and then by performing a linear mixing process on the result of the XOR operation.

The present invention provides a stream encryption method for performing an encryption process in units of words by using a clock controller. The method may include the following processes. A first pseudo random number sequence is generated from key information. A second pseudo random number sequence is generated based on clock control performed in accordance with said first pseudo random number sequence. First and second nonlinear function calculations are applied to said second pseudo random number sequence to generate first and second pre-keystreams, respectively. Exclusive OR operation over the first pre-keystream and the first pseudo random number sequence is performed, thereby generating a keystream. Exclusive OR operation over said keystream and a plain text is performed, thereby generating an encrypted text.

Further, the present invention is a stream encryption method for performing an encryption process in units of words by using a clock controller, may include: a step for generating a first pseudo random number sequence according to an internal state of the stream encryption; a step for generating a second pseudo random number sequence based on clock control performed according to the first pseudo random number sequence; a step for generating a keystream by receiving the second pseudo random number sequence as an input and by applying thereto a nonlinear function calculation; a step for generating an encrypted text by performing XOR operation over the generated keystream and plain text; and a step for setting the internal state in which, after decrypting the encrypted text, to which identification information for self-synchronization is attached at predetermined intervals, by referring to the identification information, the encrypted text is set as an initial value, and then the internal state is set according to the initial value and key information.

Still further, the present invention is a program used in a stream encryption device which performs an encryption process in units of words by using a clock controller, and the program leads a computer to execute: a first process for generating a first pseudo random number sequence from key information; a second process for generating a second pseudo random number sequence based on clock control performed according to the first pseudo random number sequence; a third process for generating a keystream by receiving the second pseudo random number sequence as an input and by applying thereto a nonlinear function calculation; and a fourth process for generating an encrypted text by performing XOR operation over the generated keystream and plain text.

In the present invention, the third process includes: a sub-process for generating a pre-keystream by receiving the second pseudo random number sequence as an input and by applying thereto a nonlinear function calculation; and a sub-process for generating a keystream by first performing XOR operation over the pre-keystream and the first or second pseudo random number sequence, and then by performing a linear mixing process based on the result of the XOR operation.

Furthermore, the present invention is a program to be executed in a stream encryption device to perform an encryption process in units of words by using a clock controller. The encryption process includes: a process for generating a first pseudo random number sequence according to an internal state of the stream encryption; a process for generating a second pseudo random number sequence based on clock control performed according to the first pseudo random number sequence; a process for generating a keystream by receiving the second pseudo random number sequence as an input and by applying thereto a nonlinear function calculation; a process for generating an encrypted text by performing XOR operation over the generated keystream and plain text; and a process for setting the internal state in which, after decrypting the encrypted text, to which identification information for self-synchronization is attached at predetermined intervals, by referring to the identification information, the encrypted text is set as an initial value, and then the internal state is set according to the initial value and key information.

According to the present invention, a first pseudo random number sequence is generated from key information, a second pseudo random number sequence is generated based on clock control performed according to the first pseudo random number sequence, and a keystream is generated by applying a nonlinear function calculation to the second pseudo random number sequence, thereby enabling the performance of clock control which makes use of characteristics of the encryption process in units of words and improving the security without impairing efficiency. Moreover, since the clock is not directly reflected in the keystream, such an effect that methods of analysis are limited can be obtained.

Further, by performing XOR operation over an output of a nonlinear function calculation process performed by a non-linear function calculator and an output of the same before the nonlinear function calculation process is performed, and then by performing a linear mixing process by a linear mixing processing unit on the resultant output of the XOR operation, randomness possessed originally by the first and the second pseudo random number generator and periodicity possessed originally by the nonlinear function calculator can be leveled. Accordingly, not only the security but also the randomness and the periodicity can be secured.

Furthermore, in the present invention, identification information for self-synchronization is attached to the encrypted text at predetermined intervals at a sender (encryption) side, and if the identification information for self-synchronization is attached to the encrypted text when the identification information is referred to at a receiver (decryption) side, the encrypted text after being decrypted, is set as an initial value, and then internal states of the first pseudo random number generator and the second pseudo random number generator are set according to the initial value and key information. By performing the above-described series of processes, automatic recovery at the receiver side is possible even when deviation in the synchronization occurs between the sender and the receiver sides, thereby ensuring the security.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure:

FIG. 7 is diagram cited for explaining an example of a linear mixing process performed by the stream encryption device according to the second embodiment of the present invention;

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
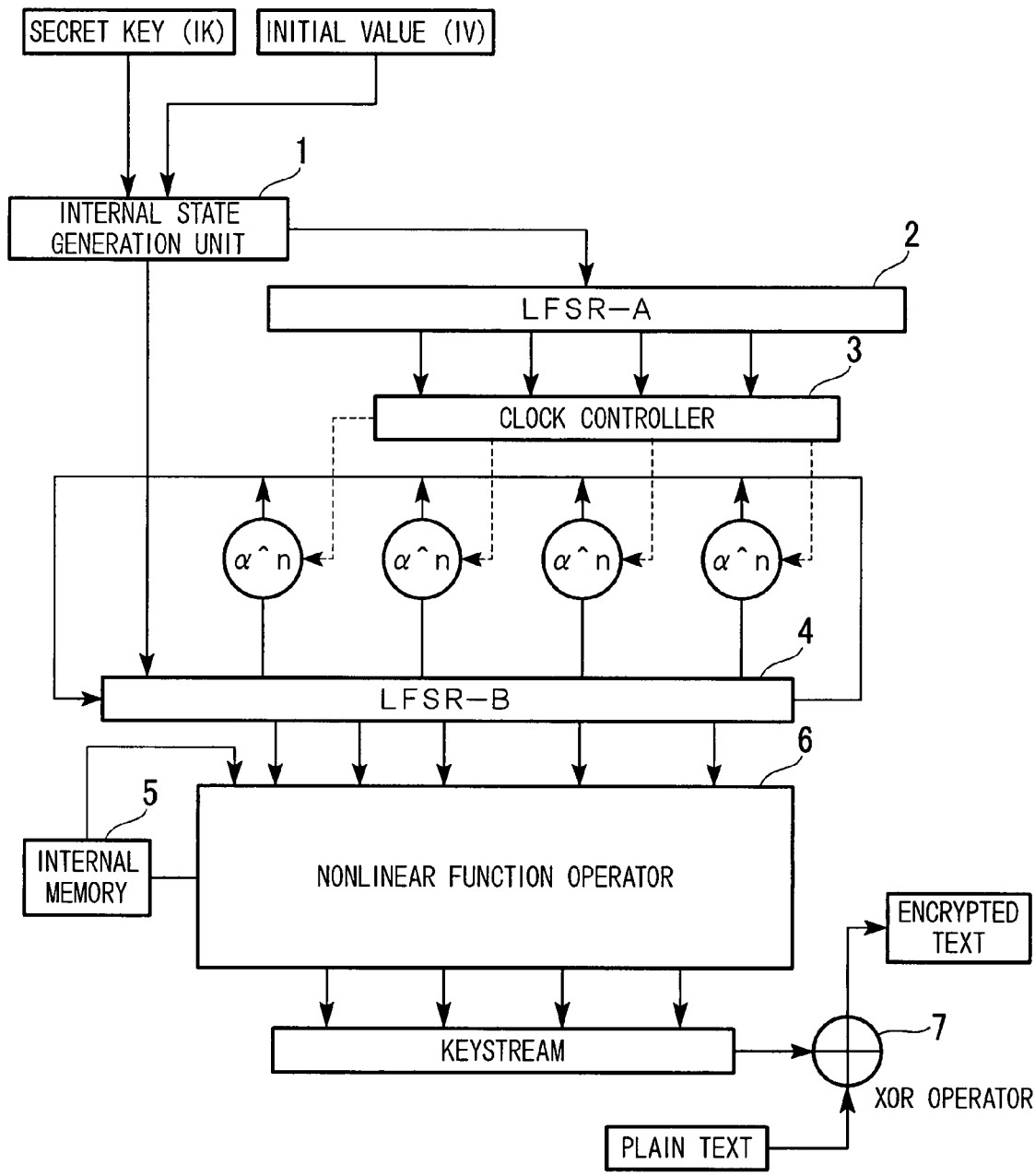
FIG. 1 is a block diagram showing an internal configuration of a stream encryption device according to a first embodiment of the present invention.

FIG. 1 is a block diagram showing an internal configuration of a stream encryption device according to a first embodiment of the present invention. The stream encryption device according to this embodiment of the present invention includes an internal state generation unit 1, an LFSR-A (a first pseudo random number sequence generation unit) 2, a clock controller 3, an LFSR-B (a second pseudo random number sequence generation unit) 4, an internal memory 5, a nonlinear function operator 6, and an exclusive OR (XOR) operator 7.

The internal state generation unit 1 executes a stored key schedule algorithm on a secret key (IK) and an initial value (IV), which are entered from an external device as input values, to determine internal states, and sets the resultant internal states to the linear feedback shift register LFSR-A (2) used as a first pseudo random number generator and to the linear feedback shift register LFSR-B (4) used as a second pseudo random number sequence generator, respectively.

A keystream (a second pseudo random number sequence) generated by the LFSR-B (4) is then supplied as an input value to the nonlinear function operator 6 used as a keystream generator. The nonlinear function generator 6 executes a nonlinear function calculation over the input keystream and contents stored in the internal memory 5 (the initial value is 0x00) to generate a new keystream.

On the other hand, the output of the nonlinear function generator 6 is also supplied to the internal memory 5, and the output of the internal memory 5 whose contents have been updated is fed back as an input to the nonlinear function operator 6. The LFSR-A (2) outputs a keystream (a first pseudo random number sequence) to the clock controller 3 which manages clock control. The clock controller 3 is structured such that the clock (shift amount) is determined according to the input keystream to control the LFSR-B (4).

The operator 7 used as an encrypter performs XOR operation over plain text and the keystream output from the nonlinear function operator 6 to output an encryption text.

Figure 2:
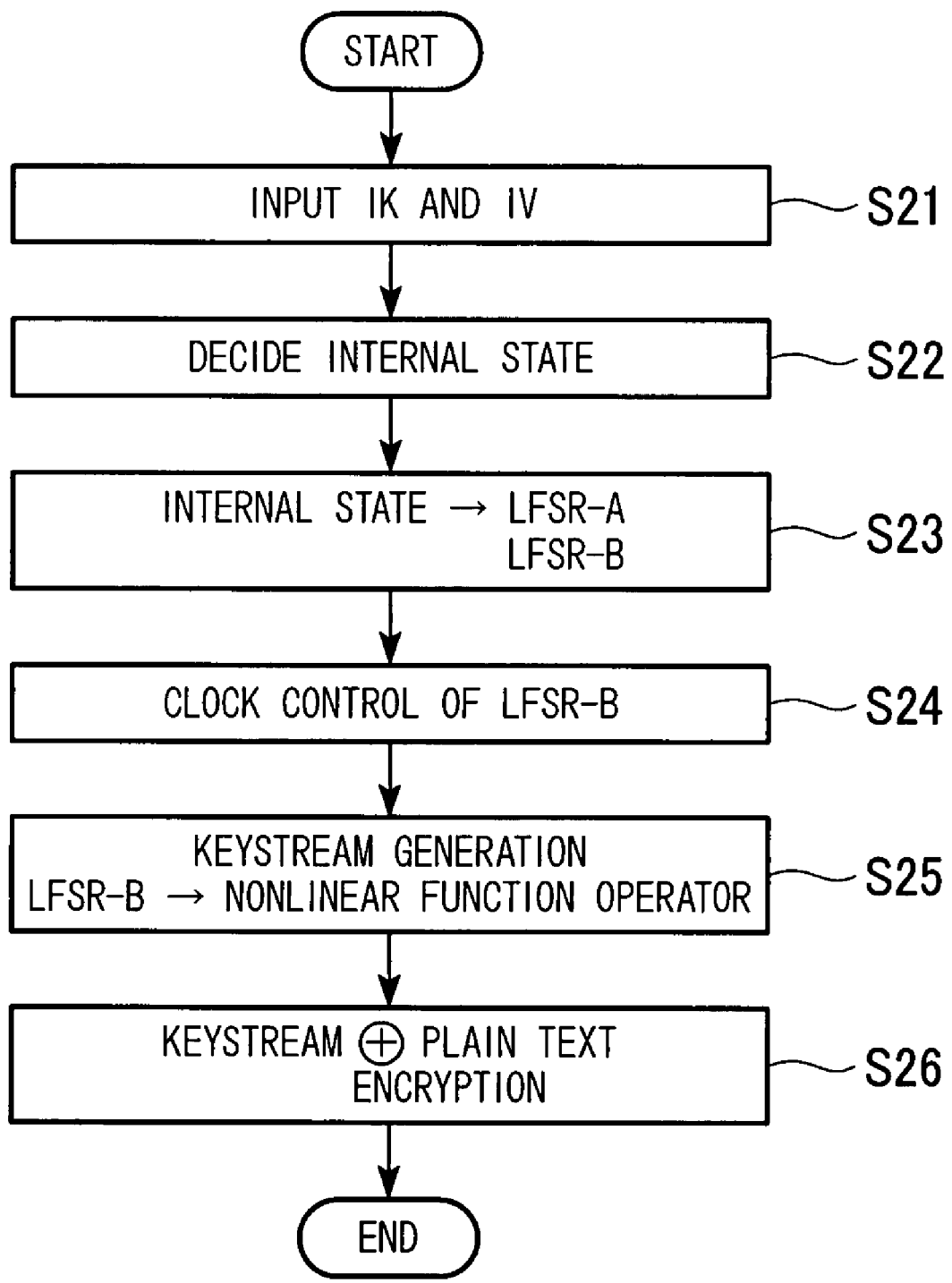
FIG. 2 is a flowchart cited for explaining each step of a stream encryption method according to the first embodiment of the present invention.
Figure 3:
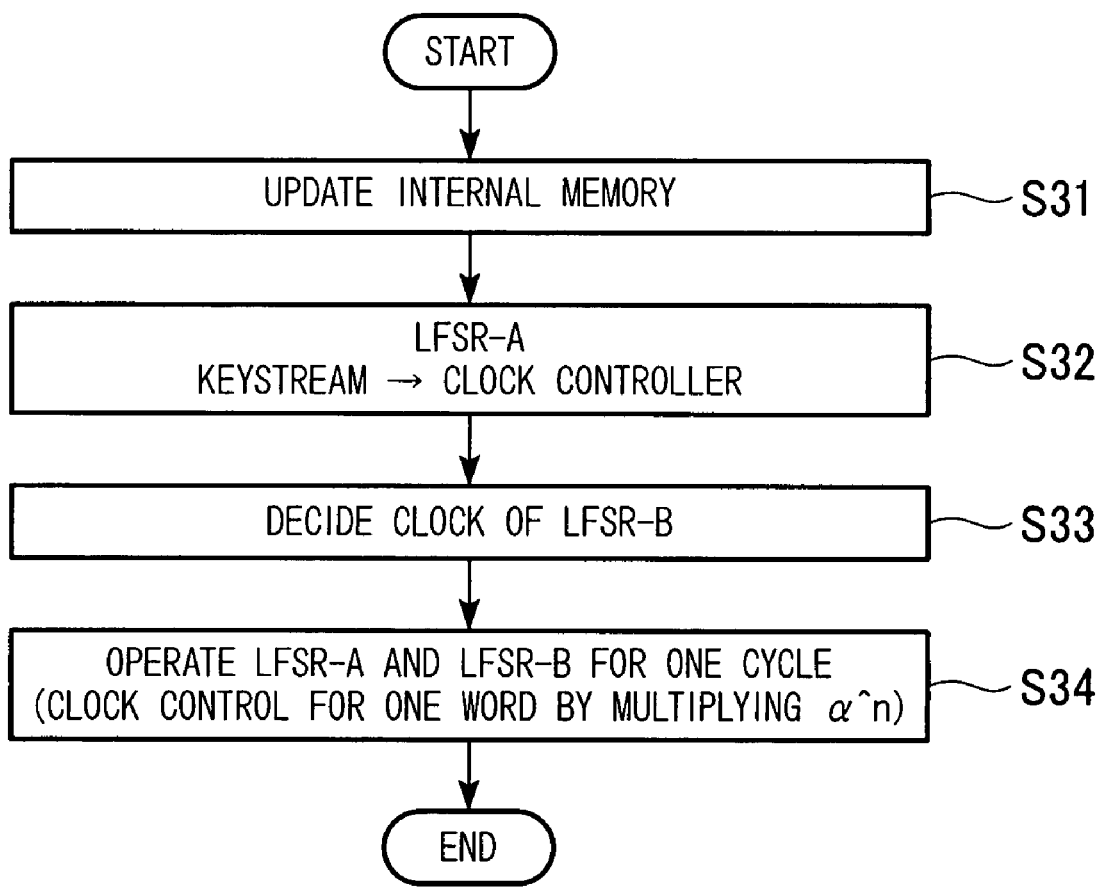
FIG. 3 is a flowchart cited for explaining each step of the stream encryption method according to the first embodiment of the present invention.

FIGS. 2 and 3 are flowcharts cited for explaining each step of the stream encryption method according to the embodiment of the present invention. The stream encryption method according to the (first) embodiment of the present invention and the operations of the stream encryption device shown in FIG. 1 will be described below in detail with reference to the flowcharts shown in FIGS. 2 and 3.

First, an initial process and a keystream process will be described with reference to the flowchart shown in FIG. 2. First of all, the initial process will be described. Before setting the internal states to the LFSE-A (2) and the LFSR-B (4), the secret key (initial key) and the initial value are input to the internal state generation unit 1 (S21). The internal state generation unit 1 determines internal states according to a predetermined key schedule algorithm (S22), and sets the internal states (the first pseudo random number sequence, and the second pseudo random number sequence) to the LFSE-A (2) and the LFSR-B (4), respectively (S23).

After the above-described initial process, a keystream process for encryption or decryption is performed according to the following procedure. That is, the keystream (the second pseudo random number sequence) output from the LFSR-B (4) is supplied as an input to the nonlinear function operator 6 through the clock control managed by the clock controller 3 (S24), as will be described later. The nonlinear function generator 6 executes a nonlinear function calculation over the input keystream and the contents stored in the internal memory 5 (the initial value is 0x00) to generate a new keystream (S25). Then, the keystream generated by the nonlinear function generator 6 is supplied to the operator 7, where XOR operation over the keystream and plain text is performed, thereby generating an encrypted or decrypted text (S26).

Next, an updating process of the above-described internal states will be described with reference to the flowchart shown in FIG. 3. First, the output of the nonlinear function generator 6 is also supplied to the internal memory 5, in addition to the operator 7, and the output of the internal memory 5 whose contents have been updated is fed back as an input to the nonlinear function operator 6 (S31). Moreover, the LFSR-A (2) outputs the first pseudo random number sequence to the clock controller 3, which manages the clock control (S32).

The clock controller 3 determines the clock according to the input keystream (the first pseudo random number sequence) to control the LFSR-B (4) (S33). To be more specific, the LFSR-A (2) and the LFSR-B (4) are operated for one cycle. During the operation, the clock controller 3 performs the clock control (multiplying $\alpha^n$) for the bit shift of the feedback polynomial of the LFSR-B (4) (the wire-bound portion in FIG. 1) (S34) according to root $\alpha$ of a polynomial which defines a Galois finite field of degree 2 ($GF2^N$). Here, n denotes a decided number of clocks (shift amount). Accordingly, the clock control within one word is performed. Then, the procedure returns to the above-described keystream generation process, and the above-described processes are repeated thereafter.

As described above, the present invention generates the first pseudo random number sequence from the key information, generates the second pseudo random number sequence based on the clock control performed according to the first pseudo random number sequence, and generates a keystream by applying a nonlinear function calculation to the second pseudo random number sequence, thereby enabling the performance of clock control which makes use of characteristics of the encryption process performed in units of words and improving the security without impairing the efficiency. According to the present invention, since the clock is not directly reflected in the generated keystream, an incidental effect such that methods of analysis will be limited can be obtained.

Further, in the present invention, the second pseudo random number generator is composed of the LFSR, and the clock control is introduced to the bit shift of the feedback polynomial, thereby enabling improvement of the security and minimizing the loss. Still further, the present invention can construct a mechanism in which an initial value independent from the LFSR is set to the first pseudo random number generator according to the key schedule algorithm adopted in block ciphers, thereby improving the security, and in which by using an algorithm, such as a hash function, whose oneway function is secured, a shared key will not be jeopardized even if the internal state is leaked.

Second Embodiment

Figure 4:
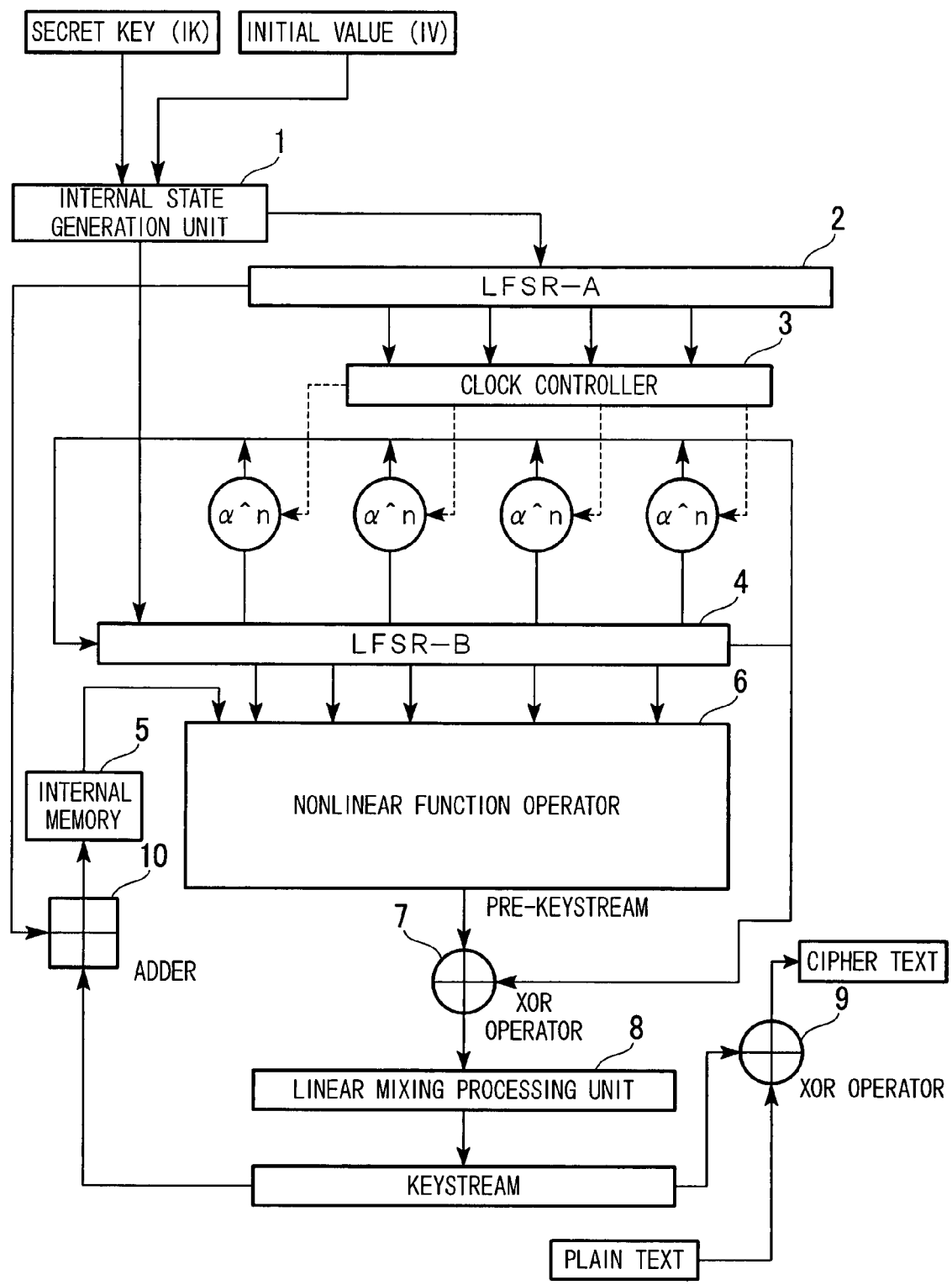
FIG. 4 is a block diagram showing an internal configuration of a stream encryption device according to a second embodiment of the present invention.

FIG. 4 is a block diagram showing an internal configuration of a stream encryption device according to a second embodiment. The stream encryption device according to the second embodiment includes an internal state generation unit 1, a first pseudo random number sequence generation unit 2, a clock controller 3, a second pseudo random number sequence generation unit 4, an internal memory 5, a nonlinear function generator 6, an exclusive OR (XOR) operator 7, a linear mixing processing unit 8, an XOR operator 9, and an adder 10. Since the elements designated by the same reference numerals as those in the first embodiment have the same functions as those in the first embodiment, detailed description thereof will be omitted.

The linear mixing processing unit 8 executes a linear mixing process based on the result of XOR operation of a pre-keystream generated by the nonlinear function operator 6 and the second pseudo random number sequence generated by the LFSR-B (4) to generate a keystream, and supplies the resulting keystream to one of input terminals of both the XOR operator 9 and the adder 10.

To the other input terminal of the adder 10, a keystream (the first pseudo random number sequence) output from the LFSR-A (2) is supplied. The adder 10 operates an arithmetic addition over the keystream output from the linear mixing processing unit 8 and the keystream (the first pseudo random number sequence) output from the LFSR-A (2), and supplies the result thereof to the internal memory 5 to update the contents of the internal memory 5. The XOR operator 9 used as an encrypter performs XOR operation over plain text and the keystream output from the linear mixing processing unit 8 to output an encrypted text (referred to as a cipher text hereinafter).

Figure 5:
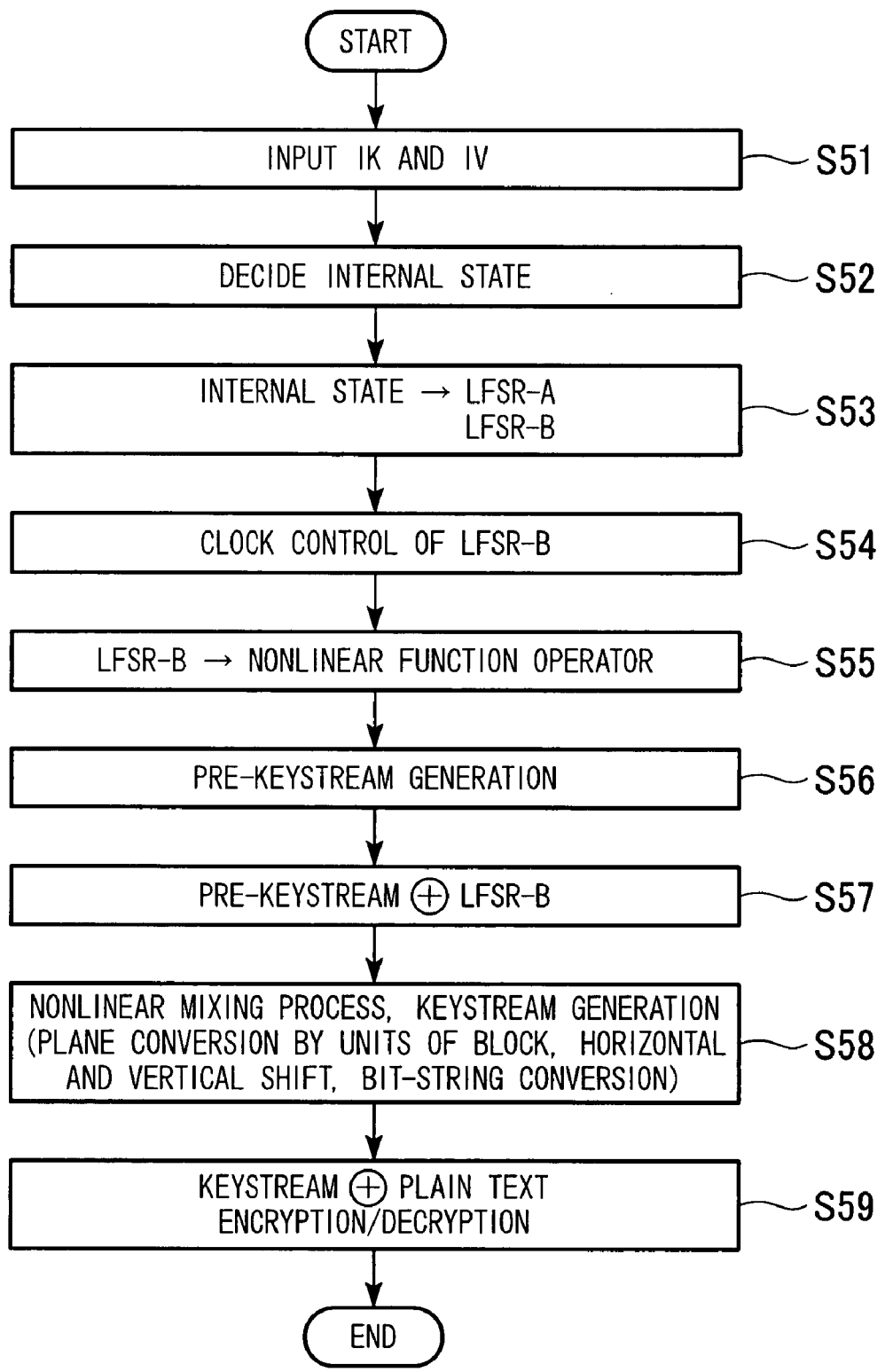
FIG. 5 is a flowchart cited for explaining each step of a stream encryption method according to the second embodiment of the present invention.
Figure 6:
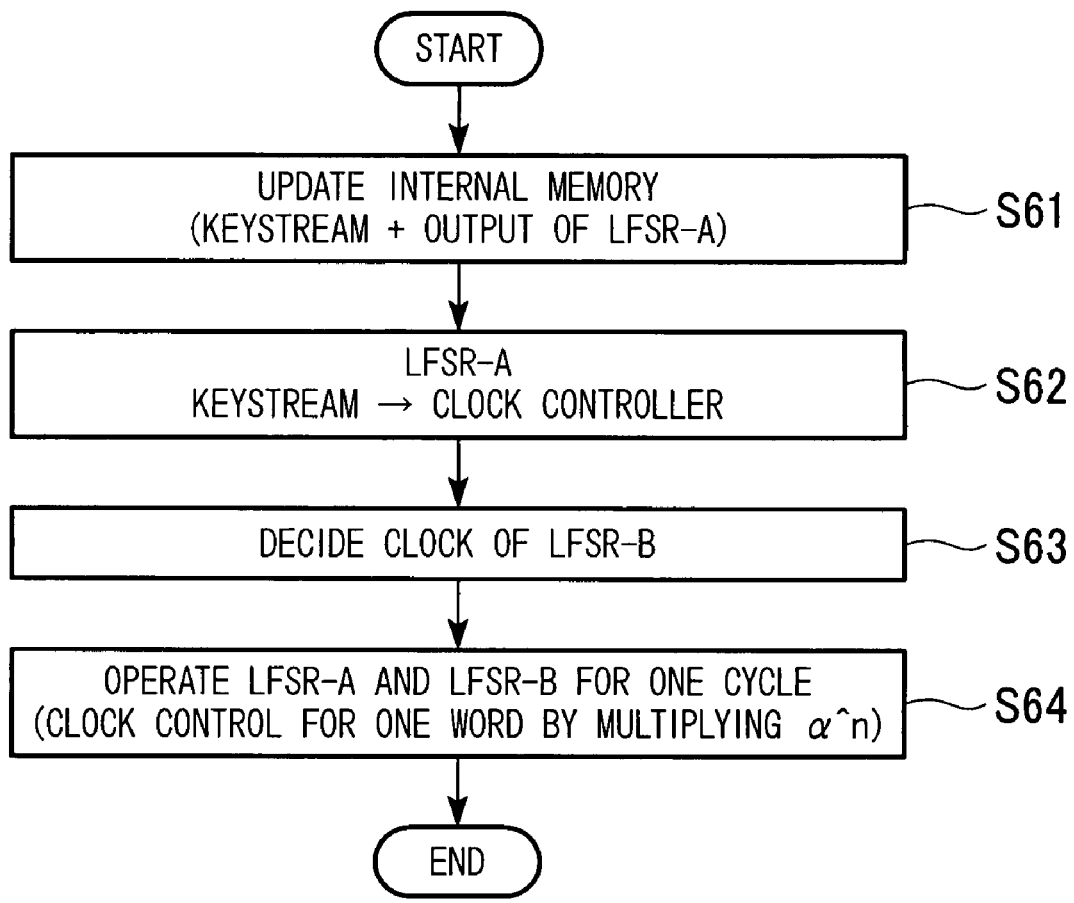
FIG. 6 is a flowchart cited for explaining each step of the stream encryption method according to the second embodiment of the present invention.

FIGS. 5 and 6 are flowcharts cited for explaining each step of a stream encryption method according to the present embodiment. The stream encryption method according to the (second) embodiment of the present invention and the operations of the stream encryption device shown in FIG. 4 will be described below in detail with reference to the flowcharts shown in FIGS. 5 and 6.

First, an initial process and a keystream process will be described with reference to the flowchart shown in FIG. 5. First of all, the initial process will be described. Before setting the internal states to the LFSR-A (2) and the LFSR-B (4), the secret key (initial key) and the initial value are set from an external device to the internal state generation unit 1 (S51). The internal state generation unit 1 determines internal states according to a predetermined key schedule algorithm (S52), and sets the internal states (the first pseudo random number sequence, and the second pseudo random number sequence) to the LFSR-A (2) and the LFSR-B (4), respectively (S53).

After the above-described initial process, the stream encryption device of the present invention performs a keystream process for encryption or decryption according to the following procedure. That is, the keystream (the second pseudo random number sequence) output from the LFSR-B (4) is supplied as an input to the nonlinear function generator 6 (S55) based on the clock control managed by the clock controller 3 (S54), as will be described later. The nonlinear function generator 6 executes a nonlinear function calculation over the input keystream and the contents stored in the internal memory 5 (the initial value is 0x00) to generate a pre-keystream (S56). Then, the pre-keystream generated by the nonlinear function generator 6 is supplied to the XOR operator 7, which performs XOR operation over the pre-keystream and the keystream (the second pseudo random number sequence) output from the LFSR-B (4) and then supplies the result thereof to the linear mixing processing unit 8 (S57).

The linear mixing processing unit 8 executes a linear mixing process on the output of the XOR operator 7, and in the process, for example, as shown in FIG. 7, (a) the result of the XOR operation is entered as input data, (b) the data is divided by units of block and allocated in a plane, (c) the data is shifted in the horizontal direction, (d) the data is shifted in the vertical direction, and (e) the data is converted again to a bit-string to be output as a keystream (S58).

In this way, the linear mixing processing unit 8 performs a linear mixing process on the output result of the XOR operation of the pre-keystream output from the nonlinear function operator 6 and the keystream (the second pseudo random number sequence) output from the LFSR-B (4), thereby enabling evening of randomness possessed originally by the LFSR-A (2) and the LFSR-B (4) and periodicity possessed originally by the nonlinear function operator 6. Accordingly, the randomness and the periodicity can be secured.

The keystream output from the mixing processing unit 8 is supplied to the XOR operator 9 together with plain text, and is encrypted or decrypted by the XOR operator 9 to create a cipher text (S59).

Next, an updating process of the above-described internal states will be described with reference to the flowchart shown in FIG. 6. The keystream output from the linear mixing processing unit 8 is also supplied to the adder 10 in addition to the XOR operator 9. To the adder 10, another keystream (the first pseudo random number sequence) is also supplied from the LFSR-A (2), and the contents of the internal memory 5 are updated according to the keystream generated as a result of the arithmetic addition operated on the adder 10 (S61).

Accordingly, the contents stored in the internal memory 5 are concealed, thereby further improving the security. That is, even if the keystream output from the linear mixing processing unit 8 is revealed, the contents of the internal memory 5 will never leak unless the keystream output from the LFSR-A (2) is conjectured.

The output of the internal memory 5 whose contents have been updated is fed back as an input to the nonlinear function generator 6. Moreover, the LFSR-A (2) outputs the first pseudo random number sequence to the clock controller 3, which manages the clock control (S62).

The clock controller 3 determines the clock according to the input keystream (the first pseudo random number sequence) to control the LFSR-B (4) (S63). To be more specific, the LFSR-A (2) and the LFSR-B (4) are operated for one cycle. During the operation, the clock controller 3 performs the clock control (multiplying $\alpha^n$) for the bit shift of the feedback polynomial of the LFSR-B (4) (the wire-bound portion in FIG. 4) (S64) according to root $\alpha$ of a polynomial which defines a Galois finite field of degree 2 (GF^N). Here, n denotes a decided number of clocks (shift amount). Accordingly, the clock control within one word is performed. Then, the procedure returns to the above-described keystream generation process, and the above-described processes are repeated thereafter.

According to the above-described embodiment of the present invention, the stream encryption device generates the first pseudo random number sequence from the key information, generates the second pseudo random number sequence based on clock control performed according to the first pseudo random number sequence, and generates a keystream by applying a nonlinear function calculation to the second pseudo random number sequence, thereby enabling the performance of clock control which makes use of characteristics of the encryption process performed in units of words and to improve the security without impairing the efficiency. Moreover, since the clock is not directly reflected in the generated keystream, an effect such that methods of analysis will be limited can also be obtained.

Further, in the present invention, the second pseudo random number generator is composed of the LFSR, and the clock control is introduced to the bit shift of the feedback polynomial, thereby enabling improvement of the security and minimizing the loss. Still further, the present invention can construct a mechanism in which an initial value independent from the LFSR is set to the first pseudo random number generator according to the key schedule algorithm adopted in block ciphers, thereby improving the security, and in which by using an algorithm, such as a hash function, whose one-way function is secured, a shared key will not be jeopardized even if the internal state is leaked.

Furthermore, by performing XOR operation over an output of a nonlinear function calculation process performed by the nonlinear function operator and an output of the same before the nonlinear function calculation process is performed, and then by performing a linear mixing process on the resultant output of the XOR operation, randomness possessed originally by the first and the second pseudo random number generator and periodicity possessed originally by the nonlinear function calculator can be leveled. Accordingly, not only the security but also the randomness and the periodicity can be secured.

Third Embodiment

Figure 8:
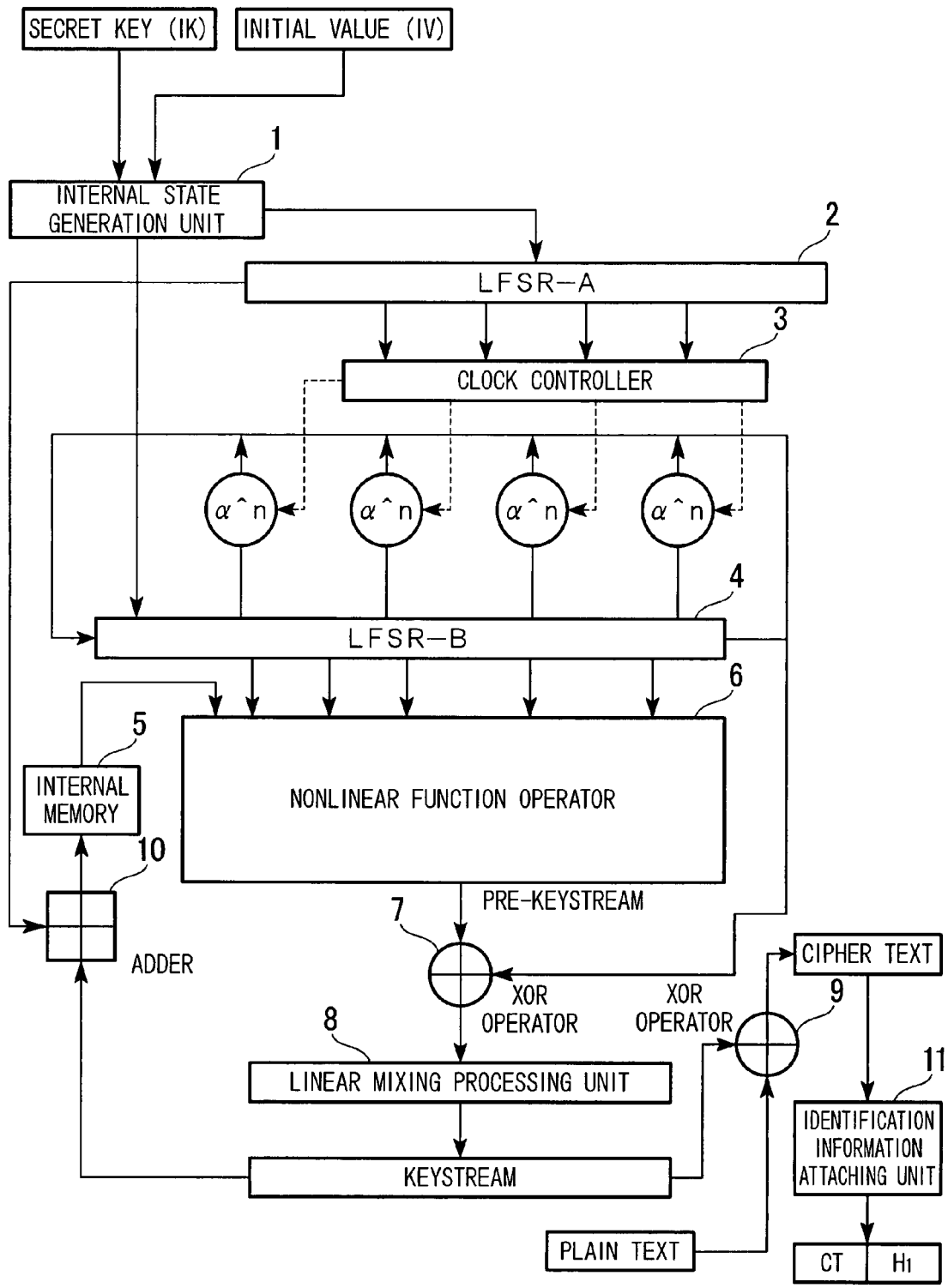
FIG. 8 is a block diagram showing an internal configuration of an applied example of the stream encryption device according to a third embodiment of the present invention.

FIG. 8 is a block diagram showing an internal configuration of an applied example of the stream encryption device according to the embodiments of the present invention. A structural difference between the present embodiment and the one shown in FIG. 4 is that an identification information attaching unit 11 is added to the output of the XOR operator 9, which generates a cipher text. The identification information attaching unit 11 is a module which attaches identification information for self-synchronization (H1) to the cipher text (CT) at predetermined intervals. And the interval can be set arbitrarily.

Figure 9:
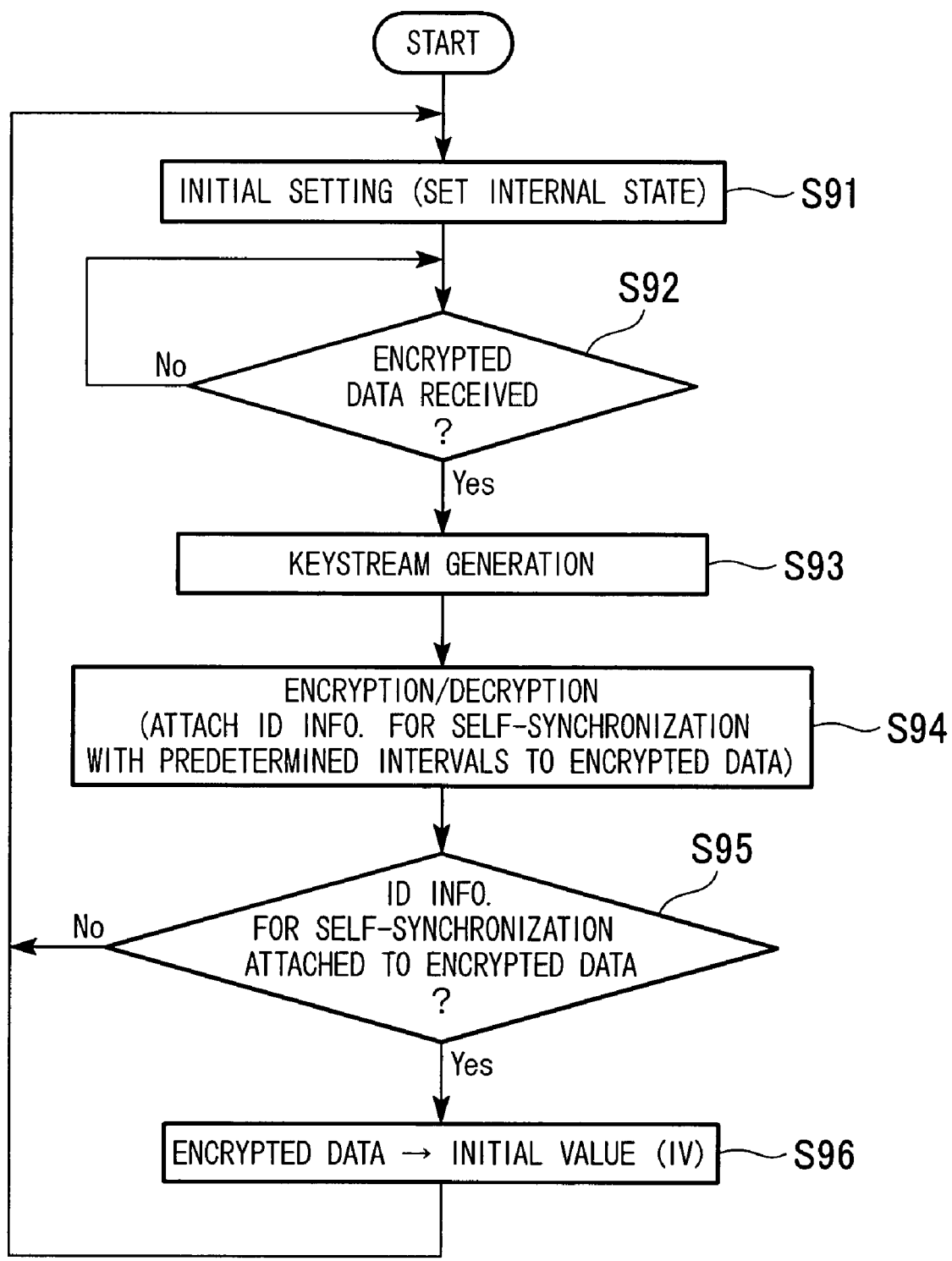
FIG. 9 is a flowchart cited for explaining operations of the stream encryption device shown in FIG. 8.

The device at a receiver (decryption) side waits in such a condition that the above-described initial process has been operated, and if the device receives cipher data, the above-described keystream generation process, encryption/decryption process, and internal state updating process are performed sequentially and the procedure returns to the initial process. This procedure is shown by a flowchart in FIG. 9. The operations of the applied example of the stream encryption device according to the embodiments of the present invention will be described below with reference to the flowchart shown in FIG. 9.

First, if identification information for self-synchronization is attached to the received cipher text, the internal state generation unit 1 executes the initial process (to set the internal state) by setting the cipher text as the initial value (IV) (S91). Here, the initial process is meant to be a process in which the internal state generation unit 1 inputs and sets a secret key (IK) and an initial value (IV) to a stored key schedule algorithm, and sets the resultant internal states decided according to the key schedule algorithm to the LFSR-A (2) and the LFSR-B (4).

The stream encryption device waits for the cipher data sent from the sender side (S92), generates a keystream through the nonlinear function operator 6 upon receiving the cipher data (S93), and executes the encryption/decryption process (S94). To be more specific, the nonlinear function operator 6 executes a nonlinear function calculation over the keystream (the second pseudo random number sequence) output from the LFSR-B (4) to generate a pre-keystream. Then, the pre-keystream and the keystream (the second pseudo random number sequence) output from the LFSR-B (4) are subjected to XOR operation. The result of the XOR operation is further subjected to a linear mixing process performed by the linear mixing processing unit 8, so that a keystream is generated (S93: keystream generation). Moreover, the cipher text is generated by the XOR operator 9 performing XOR operation over the keystream output by the linear mixing unit 8 and plain text (S94: encryption/decryption process).

The logic of encryption and that of decryption have the same structure. Consequently, if the encrypted data is encrypted, decryption thereof can be achieved. Accordingly, at the receiver side, after the decryption process is performed, the inner state setting unit 1 refers to the generated cipher text (S95), and if, for example, the identification information for self-synchronization is attached to a header thereof, the cipher text can be set as the initial value (IV) (S96). Also, by obtaining the secret key (IK) as input, the initial process according to the stored key schedule algorithm (setting the determined internal states to the LFSR-A (2) and the LFSR-B (4)) can be executed (S61).

Fourth Embodiment

Figure 10:
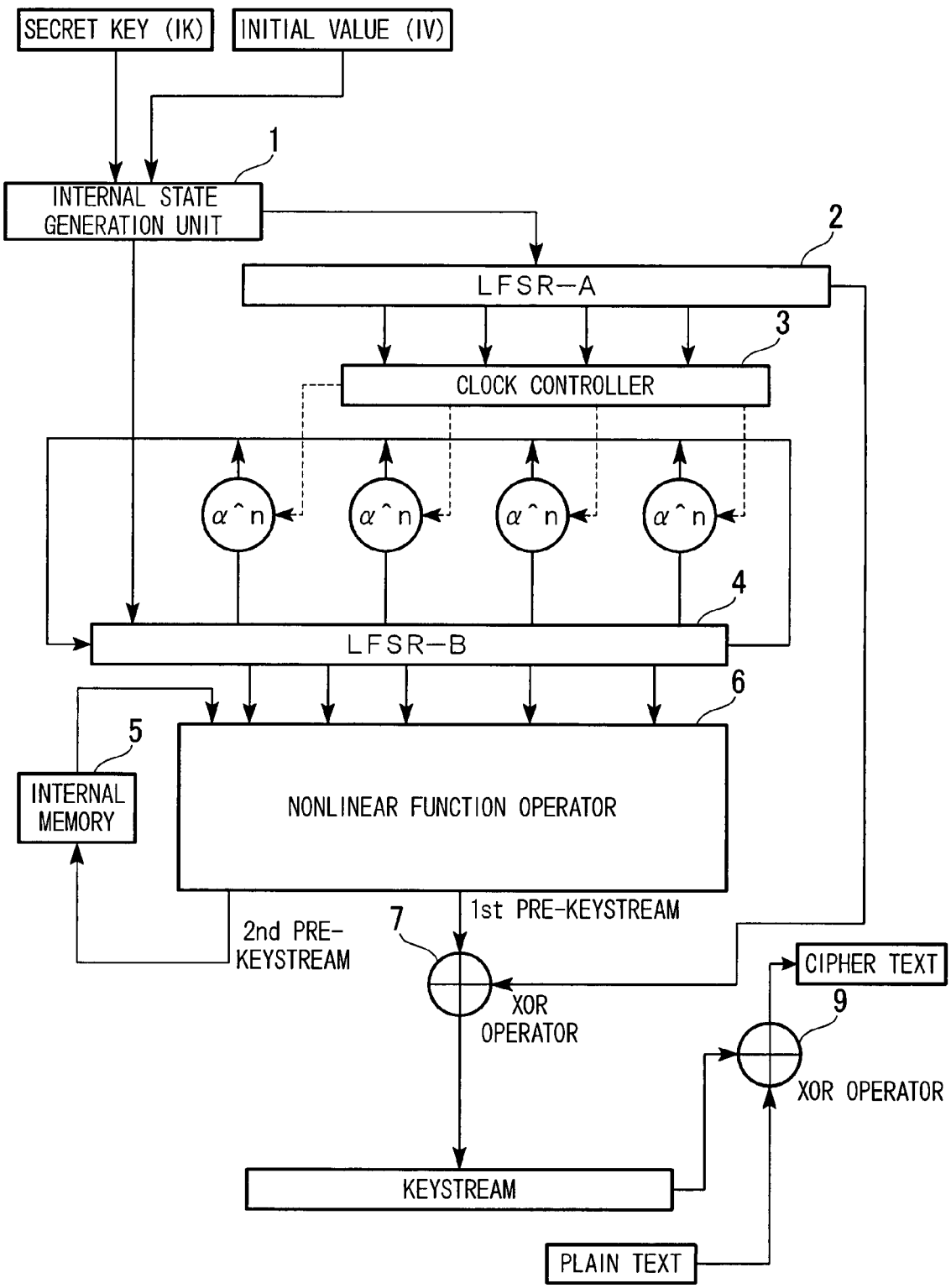
FIG. 10 is a block diagram showing an internal configuration of a stream encryption device according to the fourth embodiment.

FIG. 10 is a block diagram showing an internal configuration of a stream encryption device according to the fourth embodiment. The stream encryption device according to the fourth embodiment includes an internal state generation unit 1, a first pseudo random number sequence generation unit 2, a clock controller 3, a second pseudo random number sequence generation unit 4, an internal memory 5, a nonlinear function generator 6, an exclusive OR (XOR) operator 7, and an XOR operator 9.

The stream encryption device shown in FIG. 10 is different from the above-described stream encryption device shown in FIG. 4 in the following points of view. The stream encryption device shown in FIG. 10 does not include the above-described linear mixing processing unit 8 and the adder 10, both of which are included in the stream encryption device shown in FIG. 4.

A secret key (IK) and an initial value (IV) are entered from an external device as input values into the internal state generation unit 1. The internal state generation unit 1 executes a stored key schedule algorithm on the secret key (IK) and the initial value (IV), so as to determine internal states. The internal state generation unit 1 sets the resultant internal states into both the linear feedback shift registers LFSR-A (2) and LFSR-B (4) that perform as first and second pseudo random number generators, respectively.

The linear feedback shift register LFSR-A (2) generates a first keystream that includes a first pseudo random number sequence. The linear feedback shift register LFSR-A (2) supplies the first keystream (first pseudo random number sequence) to the clock controller 3 that manages clock control. The clock controller 3 receives the first keystream (first pseudo random number sequence) from the linear feedback shift register LFSR-A (2). The clock controller 3 determines the clock (shift amount) with reference to the first keystream (first pseudo random number sequence) so as to control the linear feedback shift register LFSR-B (4). The linear feedback shift register LFSR-A (2) also supplies the first keystream (first pseudo random number sequence) to the XOR operator 7.

The linear feedback shift register LFSR-B (4) generates a second keystream that includes a second pseudo random number sequence. The linear feedback shift register LFSR-B (4) supplies the second keystream (second pseudo random number sequence) to the nonlinear function operator 6 that performs as a pre-keystream generator.

The nonlinear function operator 6 receives the second keystream (second pseudo random number sequence) from the linear feedback shift register LFSR-B (4). The nonlinear function operator 6 also receives the contents stored in the internal memory 5 (the initial value is 0x00). The nonlinear function operator 6 executes a first nonlinear function calculation over the input keystream and the contents stored in the internal memory 5 so as to generate a first pre-keystream. The nonlinear function operator 6 supplies the first pre-keystream to the XOR operator 7. The nonlinear function operator 6 also executes a second nonlinear function calculation over the input keystream and the contents stored in the internal memory 5 so as to generate a second pre-keystream. The nonlinear function operator 6 supplies the second pre-keystream to the internal memory 5. The internal memory 5 receives the second pre-keystream from the nonlinear function operator 6. The internal memory 5 updates the previous contents with the second pre-keystream and stores the new contents which will be fed back to the nonlinear function operator 6.

The XOR operator 7 receives the first pre-keystream from the nonlinear function operator 6. The XOR operator 7 also receives the first keystream (first pseudo random number sequence) from the linear feedback shift register LFSR-A (2). The XOR operator 7 performs an XOR operation of the first pre-keystream and the first keystream (first pseudo random number sequence) so as to generate a third keystream. The third keystream is regarded as the result of the XOR operation. The XOR operator 7 supplies the third keystream to the XOR operator 9. A plain text is entered into the XOR operator 9. The XOR operator 9 performs as an encrypter. The XOR operator 9 executes an XOR operation of the third keystream and the plain text, thereby generating an encrypted text that can be referred to as a cipher text.

Figure 11:
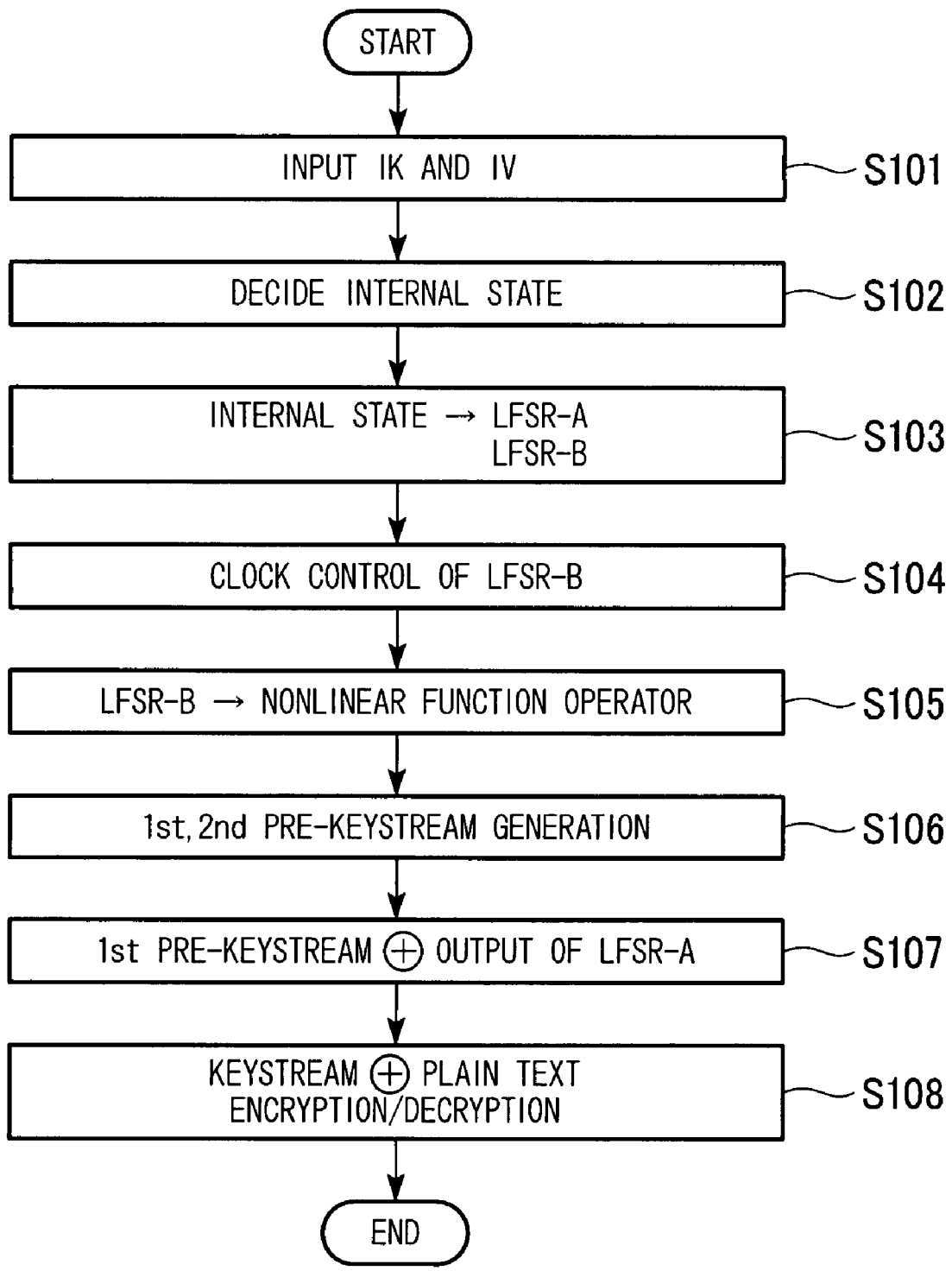
FIG. 11 is a flowchart illustrating an initial process and a keystream process of the stream encryption device of FIG. 10.
Figure 12:
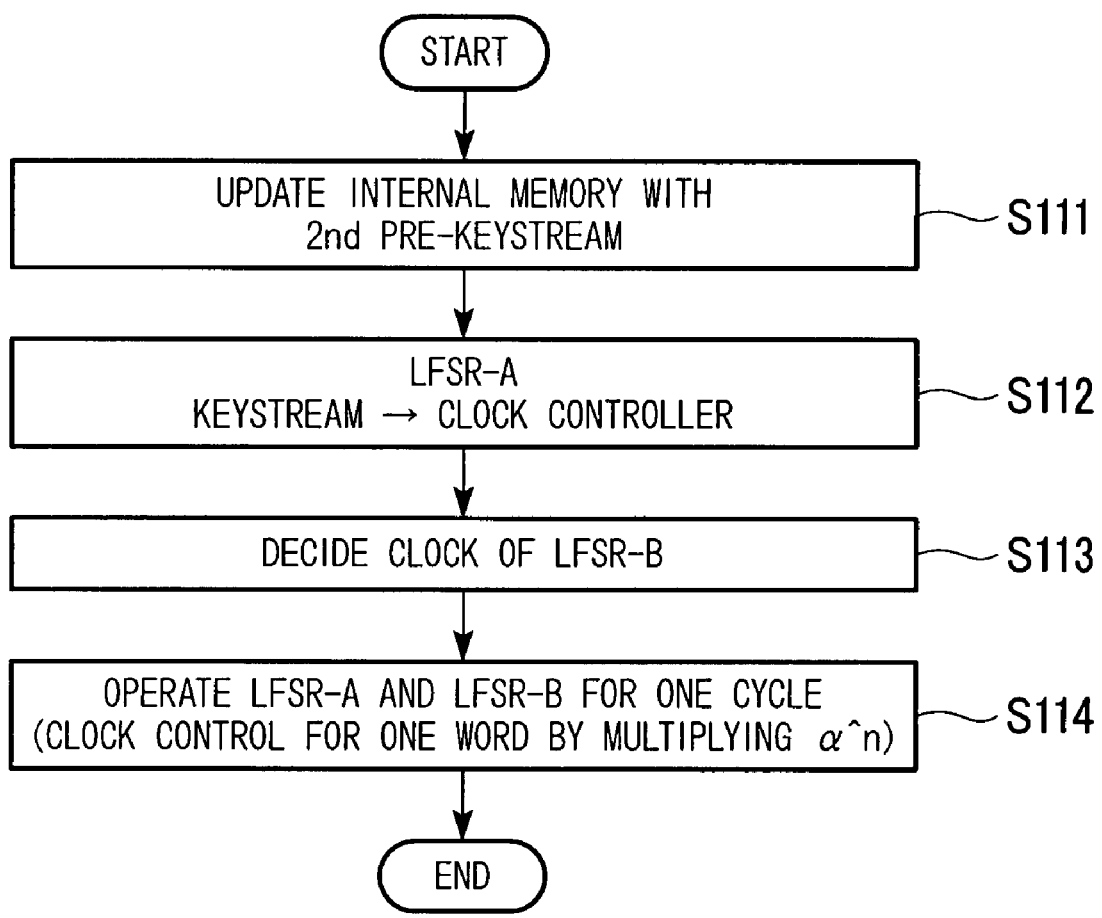
FIG. 12 is a flowchart illustrating an updating process of internal states of the stream encryption device of FIG. 10.

FIGS. 11 and 12 are flowcharts explaining each step of a stream encryption method according to the fourth embodiment of the present invention. The stream encryption method and the operations of the stream encryption device shown in FIG. 10 will be described below in detail with reference to the flowcharts shown in FIGS. 11 and 12.

First, an initial process and a keystream process will be described with reference to the flowchart shown in FIG. 11. First of all, the initial process will be described. Before setting the internal states to the linear feedback shift registers LFSR-A (2) and LFSR-B (4), the secret key (initial key) and the initial value are entered from an external device into the internal state generation unit 1 (S101). The internal state generation unit 1 determines first and second internal states based on a predetermined key schedule algorithm (S 102). The internal state generation unit 1 sets the first and second internal states into the linear feedback shift registers LFSR-A (2) and LFSR-B (4), respectively (S103). After the above-described initial process, the stream encryption device performs a keystream process for encryption or decryption according to the following procedure.

A first keystream that includes a first pseudo random number sequence is generated by the linear feedback shift register LFSR-A (2). The first keystream (first pseudo random number sequence) is supplied from the linear feedback shift register LFSR-A (2) to the clock controller 3 that manages clock control. The clock controller 3 determines the clock (shift amount) with reference to the first keystream (first pseudo random number sequence) so that the clock controller 3 controls the linear feedback shift register LFSR-B (4) (S 104).

A second keystream that includes a second pseudo random number sequence is generated by the linear feedback shift register LFSR-B (4). Under the clock control managed by the clock controller 3, the second keystream (second pseudo random number sequence) is supplied from the linear feedback shift register LFSR-B (4) to the nonlinear function operator 6 that performs as a pre-keystream generator (S105).

First and second nonlinear function calculations over the input keystream and the contents stored in the internal memory 5 are executed by the nonlinear function operator 6, thereby generating first and second pre-keystreams (S106).

The first pre-keystream is supplied from the nonlinear function operator 6 to the XOR operator 7. The first keystream (first pseudo random number sequence) is supplied from the linear feedback shift register LFSR-A (2) to the XOR operator 7. An XOR operation of the first pre-keystream and the first keystream (first pseudo random number sequence) is performed by the XOR operator 7 so as to generate a third keystream (S107). The third keystream is regarded as the result of the XOR operation.

The third keystream is supplied from the XOR operator 7 to the XOR operator 9. A plain text is entered into the XOR operator 9. An XOR operation of the third keystream and the plain text is executed by the XOR operator 9 as an encrypter, thereby generating an encrypted text (cipher text) (S 108).

Next, an updating process of the above-described internal states will be described with reference to the flowchart shown in FIG. 12. The second pre-keystream is supplied from the nonlinear function operator 6 to the internal memory 5. The contents stored in the internal memory 5 are updated with the second pre-keystream so that the updated contents are fed back to the nonlinear function operator 6 (S111). The updating process of the above-described internal states of this embodiment is much simpler than those of the foregoing embodiments.

The output of the internal memory 5 whose contents have been updated is fed back as an input to the nonlinear function generator 6. Moreover, the LFSR-A (2) outputs the first pseudo random number sequence to the clock controller 3, which manages the clock control (S112).

The clock controller 3 determines the clock according to the input keystream (the first pseudo random number sequence) to control the LFSR-B (4) (S113). To be more specific, the LFSR-A (2) and the LFSR-B (4) are operated for one cycle. During the operation, the clock controller 3 performs the clock control (multiplying α^n) for the bit shift of the feedback polynomial of the LFSR-B (4) (represented by broken lines in FIG. 10) (S114) according to root α of a polynomial which defines a Galois finite field of degree $2(GF^N)$. Here, n denotes a decided number of clocks (shift amount). Accordingly, the clock control within one word is performed. Then, the procedure returns to the above-described keystream generation process, and the above-described processes are repeated thereafter.

The stream encryption device of FIG. 10 is simpler in configuration than the stream encryption device of FIG. 4. No linear mixing processing unit or adder is required. The simplification of the configuration may provide additional advantage in shortening the necessary time that is elapsed to obtain an intended result, for example, the encrypted text (cipher text). The stream encryption device of FIG. 10 provides the same effects as those of the stream encryption device of FIG. 4.

According to the above-described applied example of the present invention, the stream encryption device executes a series of processes as follows: the identification information for self-synchronization is attached to the encrypted text at predetermined intervals at the sender (encrypting) side; the identification information is referred to at the receiver (decrypting) side and if the identification information for self-synchronization is attached to the encrypted text, the encrypted text is set as an initial value after being decrypted; and the internal states of the first and second pseudo random number generator are set according to the initial value and key information, respectively. By executing this series of processes, automatic recovery at the receiver side is possible even when deviation in the synchronization occurs between the sender and the receiver sides, thereby further ensuring the security.

While in the embodiments of the present invention including the above-described applied example, the output of the LFSR-B (4) is used as one of inputs of the XOR operator 7, and the output of the LFSR-A (2) is used as one of inputs of the adder 10, using the output of the LFSR-A (2) and the output of the LFSR-B (4) respectively provides the same effect, and the combination thereof can be selected arbitrarily.

Further, the stream encryption device of the present invention can also be realized by first recording the procedures operated respectively by the internal state generation unit 1, the LFSR-A (2), the clock controller 3, the LFSR-B (4), the internal memory 5, the nonlinear function generator 6, the XOR operators 7 and 9, the mixing processing unit 8, the adder 10, and the identification information attaching unit 11 shown in FIGS. 4 and 8 on a recording medium which is readable by a computer, and then by installing and executing the program recorded on the recording medium on a computer system. Here, the computer system includes hardware such as operating systems (OS), peripheral equipment, and the like.

Also, when the WWW system is utilized, "the computer system" includes homepage providing environments (or displaying environments) as well. Furthermore, the above-described program may be transmitted from the computer system which has the program installed in a storage device or the like to other computer systems via transmission media or by transmitted waves in transmission media. Here, the term "the transmission media", which transmit the program, signifies media which are provided with a function to transmit information like a network (communication network) such as the Internet, and telecommunication circuits (communication lines) such as telephone lines.

Still further, the above-described program may be one which realizes a part of the above-described functions. The program may also be one which can realize the above-described functions by using, in combination, programs already recorded in the computer system, that is, the program may also be a so-called differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A stream encryption device for performing an encryption process in units of words by using a clock controller, the stream encryption device comprising:
   a first pseudo random number generator that generates a first pseudo random number sequence from key information;
   a second pseudo random number generator that generates a second pseudo random number sequence based on clock control performed in accordance with said first pseudo random number sequence;
   a keystream generator that generates a keystream by applying a nonlinear function calculation to said second pseudo random number sequence, wherein said keystream generator receives said second pseudo random number sequence as an input, applies thereto a nonlinear function calculation to generate a pre-keystream, performs exclusive OR operation over said pre-keystream and said first or second pseudo random number sequence, and performs a linear mixing process based on the result thereof to create a keystream;
   and an encrypter that generates an encrypted text by performing exclusive OR operation over said generated keystream and plain text.

2. A stream encryption device according to claim 1, wherein at least one of said first and second pseudo random number generator comprises a linear feedback shift register.

3. A stream encryption device according to claim 1, wherein said second pseudo random number generator uses root a of a polynomial which defines a finite field of degree 2, which is used to generate said second pseudo random number, and in a bit shift operation of feedback polynomial or characteristic polynomial in the linear feedback shift register composing said second pseudo random number generator, $\alpha^n$ is multiplied to perform clock control, where n represents the decided number of clocks.

4. A stream encryption device according to claim 1, wherein said first pseudo random number generator generates said first random number by applying a one-way function to said key information.

5. A stream encryption device according to claim 1, further comprising an internal memory which is updated according to data resulted from arithmetic addition or exclusive OR operation performed over said keystream and said first or second pseudo random number sequence, and which provides the data, as an input data together with said second random number, to said pre-keystream generator.

6. A stream encryption device for performing an encryption process in units of words by using a clock controller, the stream encryption device comprising:
   a first pseudo random number generator that generates a first pseudo random number sequence from key information;
   a second pseudo random number generator that generates a second pseudo random number sequence based on clock control performed in accordance with said first pseudo random number sequence;
   a pre-keystream generator that apply first and second nonlinear function calculations to said second pseudo random number sequence to generate first and second pre-keystreams, respectively;
   a first logic gate that receives the first pre-keystream from said pre-keystream generator, the first logic gate receiving the first pseudo random number sequence from the first pseudo random number generator, the first logic gate performing exclusive OR operation over the first pre-keystream and the first pseudo random number sequence, thereby generating a keystream;
   an encrypter that performs exclusive OR operation over said keystream and a plain text, thereby generating an encrypted text; and
   an internal memory that receives the second pre-keystream from the pre-keystream generator, the internal memory updating the contents with the second pre-keystream so that the updated contents are fed back to the pre-keystream generator.

7. A stream encryption device for performing an encryption process in units of words by using a clock controller, the stream encryption device comprising:
   a first pseudo random number generator that generates a first pseudo random number sequence according to an internal state of said stream encryption;
   a second pseudo random number generator that generates a second pseudo random number sequence based on clock control performed according to said first pseudo random number sequence;
   a keystream generator that generates a keystream by applying a nonlinear function calculation to said second pseudo random number sequence;
   an encrypter that generates an encrypted text by performing exclusive OR operation over said generated keystream and plain text; and
   an internal state setting unit which, after decrypting said encrypted text, to which identification information for self-synchronization is attached at predetermined intervals, by referring to said identification information, sets the encrypted text as an initial value, and then sets internal states of said first pseudo random number generator and said second pseudo random number generator according to said initial value and the key information.

8. A stream encryption method for performing an encryption process in units of words by using a clock controller, the method comprising:
   generating a first pseudo random number sequence from key information; generating a second pseudo random number sequence based on clock control performed according to said first pseudo random number sequence;
   generating a keystream by receiving said second pseudo random number sequence as an input and by applying thereto a nonlinear function calculation,
   wherein generating said keystream comprises:
      generating a pre-keystream by applying a nonlinear function calculation to said second
      pseudo random number sequence; and generating a keystream by first performing exclusive OR operation over said pre-keystream and said first or second pseudo random number sequence, and then by performing a linear mixing process based on the result of the exclusive OR operation;
   and generating an encrypted text by performing exclusive OR operation over said generated keystream and plain text.

9. A stream encryption method for performing an encryption process in units of words by using a clock controller, the method comprising:
   generating a first pseudo random number sequence from key information;

generating a second pseudo random number sequence based on clock control performed in accordance with said first pseudo random number sequence;

applying first and second nonlinear function calculations to said second pseudo random number sequence to generate first and second pre-keystreams, respectively;

performing exclusive OR operation over the first pre-keystream and the first pseudo random number sequence, thereby generating a keystream; and performing exclusive OR operation over said keystream and a plain text, thereby generating an encrypted text.

10. A stream encryption method for performing an encryption process in units of words by using a clock controller, the method comprising:

generating a first pseudo random number sequence according to an internal state of said stream encryption;

generating a second pseudo random number sequence based on clock control performed according to said first pseudo random number sequence;

generating a keystream by receiving said second pseudo random number sequence as an input and by applying thereto a nonlinear function calculation;

generating an encrypted text by performing exclusive OR operation over said generated keystream and plain text; and setting said internal state in which, after decrypting said encrypted text, to which identification information for self-synchronization is attached at predetermined intervals, by referring to said identification information, said encrypted text is set as an initial value, and then said internal state is set according to said initial value and key information.

11. A non-transitory computer-readable medium operable in a stream encryption device to perform an encryption process in units of words by using a clock controller, the medium when read in the stream encryption device operating to execute the encryption process comprising:

generating a first pseudo random number sequence from key information;

generating a second pseudo random number sequence based on clock control performed according to said first pseudo random number sequence;

generating a keystream by receiving said second pseudo random number sequence as an input and by applying thereto a nonlinear function calculation;

wherein generating said keystream comprises:

generating a pre-keystream by receiving said second pseudo random number sequence as an input and by applying thereto a nonlinear function calculation; and generating a keystream by first performing exclusive OR operation over said pre-keystream and said first or second pseudo random number sequence, and then by performing a linear mixing process on the result of the exclusive OR operation;

and generating an encrypted text by performing exclusive OR operation over said generated keystream and plain text.

12. A steam encryption method according to claim 9, wherein generating said key-stream comprises:

generating a pre-keystream by receiving said second pseudo random number sequence as an input and by applying thereto a nonlinear function calculation; and generating a key-stream by first performing exclusive OR operation over said pre-key-stream and said first or second pseudo random number sequence, and then by performing a linear mixing process on the result of the exclusive OR operation.

13. A non-transitory computer-readable medium operable in a stream encryption device to perform an encryption process in units of words by using a clock controller, the medium when read in the stream encryption device operating to execute the encryption process comprising:

generating a first pseudo random number sequence according to an internal state of said stream encryption;

generating a second pseudo random number sequence based on clock control performed according to said first pseudo random number sequence;

generating a keystream by receiving said second pseudo random number sequence as an input and by applying thereto a nonlinear function calculation;

generating an encrypted text by performing exclusive OR operation over said generated keystream and plain text; and setting said internal state in which, after decrypting said encrypted text, to which identification information for self-synchronization is attached at predetermined intervals, by referring to said identification information, said encrypted text is set as an initial value, and then said internal state is set according to said initial value and key information.

* * * * *

UNITED STATES PATENT AND TRADEMARK OFFICE
CERTIFICATE OF CORRECTION

PATENT NO. : 7,978,851 B2  Page 1 of 1
APPLICATION NO. : 11/880260
DATED : July 12, 2011
INVENTOR(S) : Shinsaku Kiyomoto et al.

It is certified that error appears in the above-identified patent and that said Letters Patent is hereby corrected as shown below:

ON THE TITLE PAGE:

Item (56) under OTHER PUBLICATIONS: should read

-- Office Action (Notice of Allowance) issued in Japanese Patent Application No. 2007-509142 on ~~April 25, 2011~~ May 10, 2011 with an English translation thereof. --

Signed and Sealed this
Thirteenth Day of September, 2011

David J. Kappos
*Director of the United States Patent and Trademark Office*